June 28, 1949.  R. L. DIVOLL  2,474,618
ALTITUDE CONTROL
Filed April 8, 1946  3 Sheets-Sheet 1
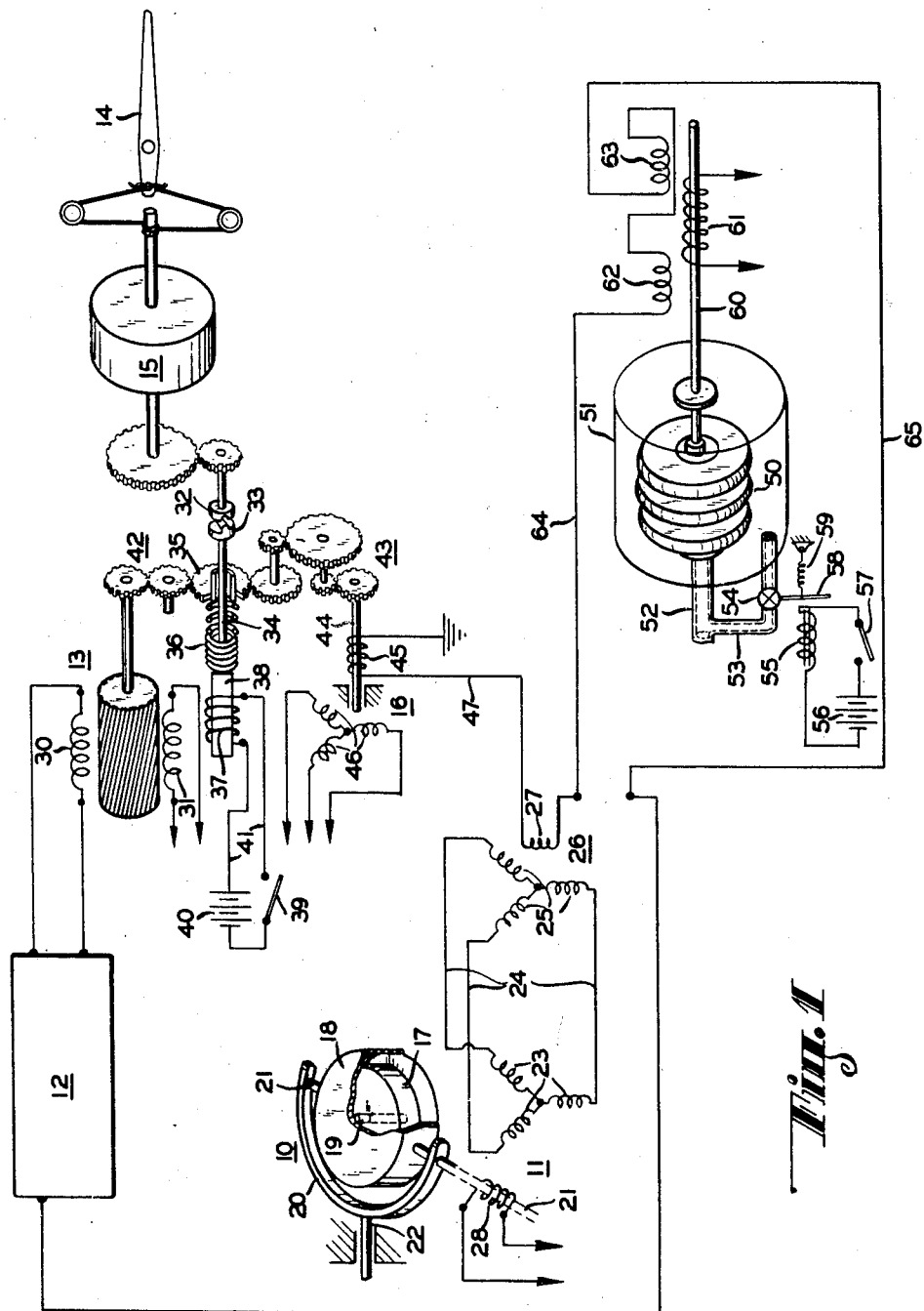
INVENTOR
RICHARD L. DIVOLL
BY
ATTORNEY

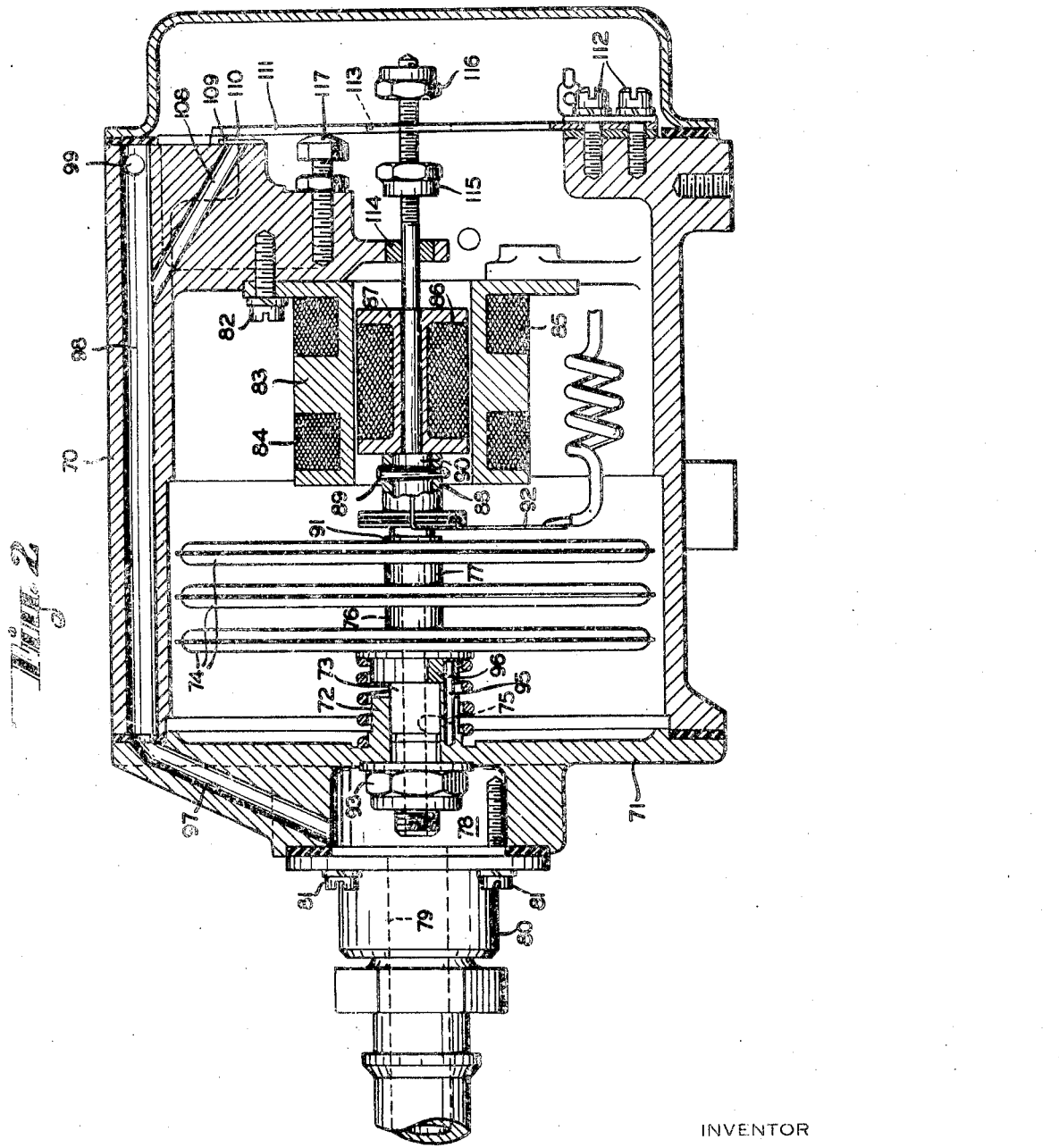

June 28, 1949.                    R. L. DIVOLL                    2,474,618
                                ALTITUDE CONTROL
Filed April 8, 1946                                          3 Sheets-Sheet 3
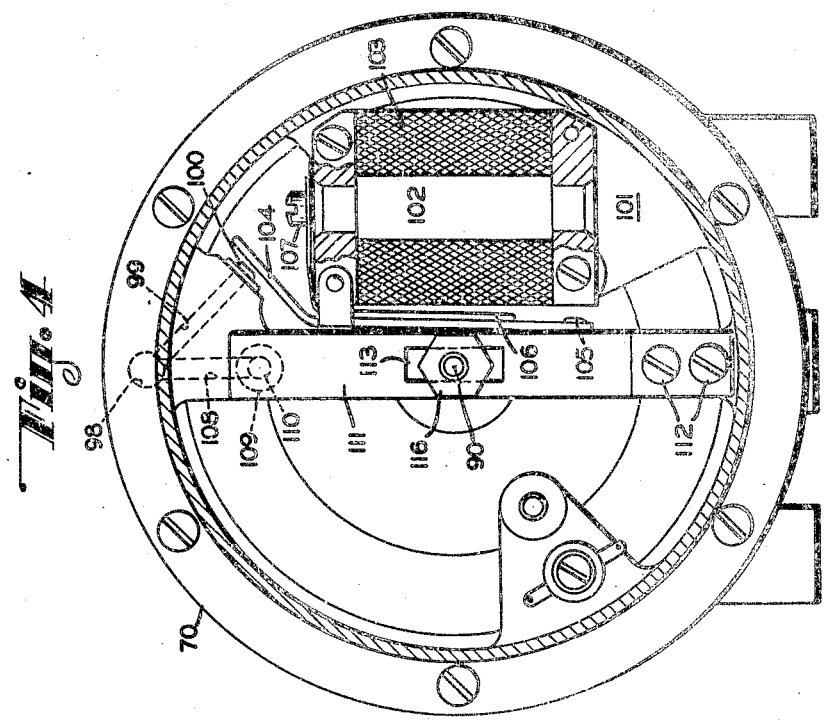
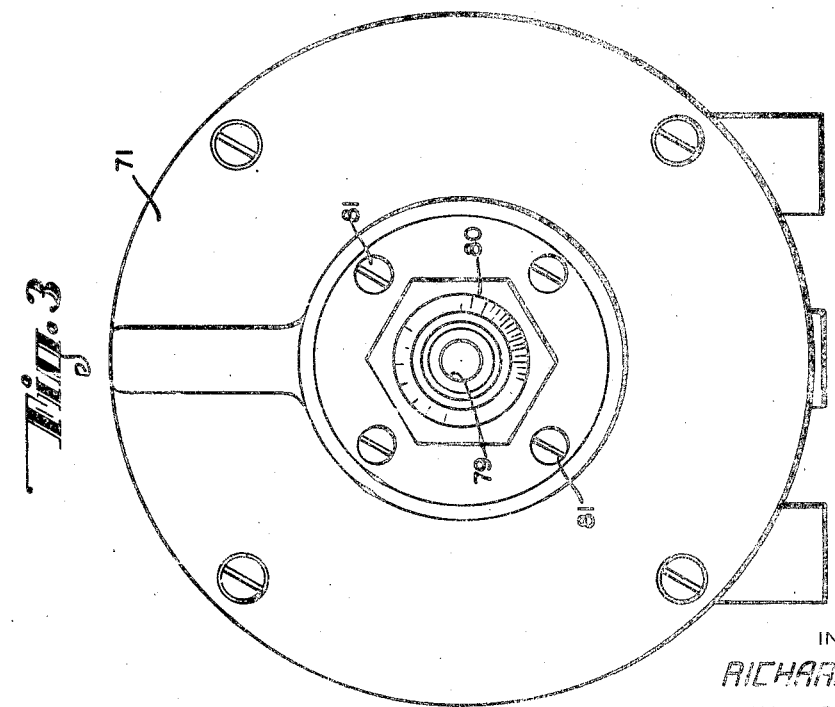
INVENTOR
RICHARD L. DIVOLL
BY
ATTORNEY Patented June 28, 1949

2,474,618

UNITED STATES PATENT OFFICE 2,474,618

ALTITUDE CONTROL

Richard L. Divoll, Maywood, N. J., assignor to Bendix Aviation Corporation, Teterboro, N. J., a corporation of Delaware Application April 8, 1946, Serial No. 660,342

15 Claims. (Cl. 318—481)

This invention relates generally to automatic steering systems for mobile craft such as aircraft, for example, and more particularly to altitude control means therefor whereby the craft, upon attaining a desired altitude, will be automatically maintained in that altitude.

Known automatic steering systems are adapted for maintaining level craft flight but are unadapted for maintaining a desired altitude level because craft elevation is subject to change due to up-drafts or down-drafts without any relative motion occurring between the fore and aft axis of the craft and the plane of level flight, such motion being required before any elevator control is available in conventional systems. To the end that this disadvantage may be overcome and that a craft may be automatically maintained at a desired altitude level, the novel arrangement of copending application Serial No. 660,343, filed April 8, 1946, has been provided. Though well suited for its intended purpose, the system there proposed is not as sensitive as may be desired especially in view of the fact that a sealed aneroid is called upon to exert a considerable amount of torque. Flight tests, for example, have demonstrated that elevator control is not as smooth as required in some applications.

The present invention contemplates the provision of a novel altitude control unit, constituting an improvement over the arrangement of the aforementioned application, wherein the pressure sensitive member is normally exposed on both of its sides to static pressure and not until the desired altitude level is attained, is one side of the member shut off from static pressure so that it will expand and contract due to pressure changes, the arrangement being such, moreover, that substantially no load is imposed on the pressure sensitive member so that the latter may accurately respond to the smallest of pressure changes. Further, the novel arrangement hereof is such that it incorporates a safety feature operable, in case the pilot trims his craft into a climb or dive without disconnecting the control unit, to automatically expose the pressure responsive member to static pressure on both of its sides and thereby protect the member against excessive contraction or expansion.

It is an object of the present invention, therefore, to provide a novel, simple and accurate altitude control expedient for maintaining craft flight at a desired altitude notwithstanding rising or descending air currents, changes in craft loading, etc.

Another object is to provide a novel automatic steering system for mobile craft whereby the craft will be automatically maintained at a desired attitude level and in a desired altitude.

A further object is to provide a novel electric altitude control unit for aircraft whereby the craft will be maintained automatically in a desired altitude of flight.

Another object is to provide a novel supplementary control for an automatic steering system for mobile craft whereby the control effected by the usual attitude control means is supplemented to provide a desired altitude control as well.

A further object of the present invention is to provide a novel automatic altitude control unit comprising a movable yieldable pressure sensitive wall connected with a linearly displaceable but normally centered electrical device so that motion of the wall due to altitude changes displaces the device in one direction or another to develop a supplementary elevator control signal.

The above and further objects and novel features of the invention will appear more fully from the following detailed description when the same is read in connection with the accompanying drawings. It is to be expressly understood, however, that the drawings are for the purpose of illustration only and are not intended as a definition of the limits of the invention.

In the drawings wherein like reference characters refer to like parts throughout the several views, Figure 1 is a diagrammatic illustration of the usual altitude control portion of an automatic steering system embodying the novel altitude control unit of the present invention;

Figure 2 is a side elevation view, in section, of one form of the novel automatic altitude control unit hereof;

Figure 3 is a rear elevation view of the control unit of Figure 2; and,

Figure 4 is a front elevation view of the control unit of Figure 2 with the front cover removed.

The level attitude control system hereof may be generally similar to the elevator control channel of the automatic steering system fully described and claimed in copending application Serial No. 516,488, filed December 31, 1943, and comprises an artificial or gyro horizon 10 provided with an electrical take-off 11 connected with the input of a conventional vacuum tube amplifier 12, the output of which, in turn, energizes a two phase induction motor 13 for actuating an elevator surface 14 through a speed reduction gearing contained within a housing 15. During its operation, motor 13 likewise actuates an electrical follow-up device 16 which develops a follow-up signal for mixing with the pitch signal for modifying motor operation.

Horizon gyro 10 comprises a rotor 17 mounted within a rotor case 18 for spinning about a normally vertical spin axis 19, any desired erecting mechanism being provided to maintain the spin axis substantially vertical. Rotor case 18 supports the rotor for oscillation about a first horizontal axis by its mounting within a gimbal ring 20 by way of inner trunnions 21, the rotor being further supported for oscillation about a second horizontal axis perpendicular to the first horizontal axis by reason of the gimbal being mounted by way of an outer trunnion 22 which is journalled on the craft, provided with the automatic steering arrangement hereof, or within an instrument case secured to the craft. The axis defined by the outer trunnion 22 thus constitutes the craft bank axis while the transverse axis constituted by the inner trunnions defines the craft pitch axis.

Pitch take-off 11 comprises a transmitter which constitutes a three phase wound stator 23 which is connected by way of conductors 24 with a similar and remotely located three phase wound stator 25 of a pitch repeater device 26. Inductively coupled with stator 23 is a wound rotor 28 supported by one of the inner trunnions 21 of the horizon gyro and energized from a suitable source of alternating current (not shown). Also inductively coupled with stator 25 is a wound rotor 27 one end of which communicates with the amplifier output through the novel altitude control unit hereof.

Normally, both wound rotors 27 and 28 are synchronously positioned and rotor 27 is at its electrical null, i. e., a position in which its electrical axis is normal to the resultant of the magnetic field at stator 25 so that no signal appears within rotor 27 even though current does flow in rotor 28. As soon, however, as relative displacement occurs between the horizon gyro and the craft's fore and aft axis, relative motion also occurs between stator 23 and its rotor so that varying voltages are induced within the windings of stator 23 which are communicated to the windings of stator 25. The resultant magnetic field at stator 25 is thus displaced angularly and rotor 27, no longer being normal to the new resultant field has a signal induced therein which is communicated to the amplifier and fed therefrom to energize the variable phase 30 of motor 13, the second phase 31 of which is constantly energized from a suitable source of alternating current (not shown).

Motor 13 drives elevator surface 14 through a servo clutch comprising two co-engaging faces 32 and 33, the former connecting through speed reduction gearing 15 with the elevator surface and the latter being supported by a shaft 34 within a hollow gear 35 which fixedly mounts clutch face 33 for rotation therewith but permits slidable or reciprocal motion thereof relative thereto for clutch engagement or disengagement. An extension of shaft 34 is provided with an enlarged end for retaining one end of a coil spring 36 therein, the opposite end of which abuts gear 35. Normally, spring 36 urges clutch face 33 out of engagement with clutch face 32.

For engaging the clutch and thereby defining a drivable connection between motor 13 and surface 14, a solenoid 37 is provided having a plunger 38 abutting the free end of shaft 34. Solenoid 37 is connected through a switch 39 with a battery 40 by way of leads 41 so that by closing the switch, the solenoid is energized and the plunger ejected therefrom to provide clutch engagement.

The motor, in driving clutch face 33 through a gear system 42 meshing with gear 35, also drives, through a speed reduction gear system 43, a shaft 44 carrying a wound rotor 45 thereon which is inductively coupled with a three phase wound stator 46 of electrical follow-up device 16. In this case, stator 46 is energized from a suitable source of alternating current (not shown) and normally rests in an electrical null position, i. e., one in which the electrical axis of the rotor is normal to the resultant magnetic field of stator 46. Motion of rotor 45 from its null develops a follow-up signal therein which is communicated to amplifier 12 to be there superimposed upon the pitch displacement channel, one end of the rotor being connected to the free end of wound rotor 27 by way of a lead 47 and the other end thereof being grounded as shown.

With the development of a craft pitch condition, a signal proportional to the displacement of the craft's fore and aft axis relative to level flight is developed within wound rotor 27 to energize motor 13 which, assuming clutch switch 39 to be closed, deflects elevator surface 14 to start returning the craft to level flight. With the operation of motor 13, rotor winding 45 of device 16 is displaced angularly whereby a follow-up signal is induced therein to be impressed on the displacement signal. As more fully described in the aforementioned copending application, the follow-up signal builds up until it is equal and opposite to the pitch signal whereupon motor 13 is de-energized at which time elevator 14 has assumed a given deflected position. As the craft returns to its level attitude, the pitch signal diminishes within rotor 27 and the follow-up signal predominates to reverse motor 13 until the elevator surface again assumes a neutral position at which time rotor winding 45 is returned to its null position and the follow-up signal drops to zero and, since the desired condition between rotor 28 and stator 23 of take-off 11 is re-established, the signal within rotor winding 27 also drops to zero.

Although the system thus far described will maintain level craft attitude it is not adapted for maintaining craft flight in a desired altitude level. To provide a steering system whereby a given altitude level will be automatically maintained at all times, the novel arrangement hereof is provided.

As shown diagrammatically in Figure 1, the novel altitude control unit hereof comprises a bellows 50 mounted for expansion and contraction within a casing 51, the interior of the bellows being in direct communication with static pressure by way of a conduit 52 and the interior of the casing being in communication with static pressure by way of a conduit 53. Normally, therefore, the bellows is centered inasmuch as it is exposed to static pressure on both sides thereof. Under certain conditions, however, communication of static pressure to casing 51 may be closed and to this end a suitable solenoid operated valve 54 is provided within conduit 53, the solenoid comprising a coil 55 connected for energization with a battery 56 through a switch 57, an armature 58 being provided adjacent the coil and operatively connected with the valve so that it is urged by a spring 59 in one direction to open the valve when the coil is de-energized and in an opposite direction to close the valve when switch 57 is closed.

With switch 57 closed, therefore, any change in static pressure such as that due to altitude changes is communicated to the interior of the bellows and the latter expands or contracts depending upon whether the pressure rises or drops. Motion of the bellows is transmitted through a shaft 60 to a linearly displaceable winding 61 which is connected for energization with a suitable source of current (not shown). Winding 61 is normally centered with respect to a pair of fixed windings 62 and 63 which are connected in series opposed relation so that with the movable current conducting winding 61 centered, equal and opposite voltages are induced within windings 62 and 63 and their net value is zero while motion of the movable winding from its central or null position induces more voltage in one of windings 62 and 63 and less in the other so that a differential exists and current will flow in one direction or another, the outer end of winding 62 being connected by way of a lead 64 in series with rotor winding 27 of the pitch repeater device 26 and the outer end of winding 63 being connected by way of a lead 65 in series with the input of amplifier 12.

Assuming the switch 57 to be closed, and the craft in a desired altitude an increase in its elevation will manifest itself in a contraction of bellows 50 whereupon winding 61 is moved inwardly from its null position relative to fixed windings 62 and 63 so that a differential signal flows in the latter windings to provide a down-elevator control while a drop in craft elevation will result in bellows expansion and outward motion of winding 61 relative to fixed windings 62 and 63 so that a differential signal is developed in the latter to provide up-elevator control.

Coming now to one practical form that the novel altitude control unit of the present invention may assume, it is shown in Figure 2 as comprising a suitable casing 70 having a rear cover 71 provided with a central and apertured boss 72 which accommodates therein a shaft 73 supporting thereon a series of diaphragms forming a bellows 74, the first of the diaphragms communicating with a passage 75 formed in the shaft and bearing an apertured disc 76 which supports and communicates the second diaphragm with passage 75, the latter diaphragm supporting a second apertured disc 77 bearing thereon and communicating the last diaphragm with passage 75 of shaft 73.

Rear cover 71 is formed with a pressure chamber 78 which is exposed through a channel 79 formed in a conduit 80, secured to the rear cover by way of screws 81, to a static pressure chamber which may be the static pressure chamber of a conventional Pitot tube (not shown) and thus communicates static pressure through passage 75 to the interior of the diaphragms or bellows 74 at all times.

Secured to casing 70 by way of screws 82 is a suitable hollow cylindrical core member 83 having two parallel peripheral grooves for the reception of a pair of windings 84 and 85 which are connected in series opposed relation, as shown diagrammatically in Figure 1 and as there represented by windings 62 and 63, the free ends of windings 84 and 85 being connected to the elevator control channel as shown in Figure 1. Mounted within member 83 for linear displacement relative to windings 84 and 85 is a winding 86 carried by a core or spool 87 having a sleeve 88 formed therewith which is connected through a pin 89 with a shaft 90 secured to a disc 91 carried by the outer diaphragm. A conductor 92 connects winding 86 with a suitable source of alternating current (not shown).

Displaceable winding 86 is normally centered with respect to stator windings 84 and 85 so that equal and opposite voltages are induced in the latter so that no signal appears at the output of the fixed windings. To this end, therefore, the free end of shaft 73 is threaded for the reception of an adjustment nut 93 thereon while interposed between rear cover 71 and one side of the first diaphragm is a spring 94. Boss 72, moreover, is provided with a bore for the reception of a guide pin 95 carried by a disc 96 fastened to the first diaphragm so that adjustment of nut 93 will provide linear displacement of shaft 73 and the diaphragms relative to casing 70. In this manner, winding 86 is positioned in its normally central or null position relative to fixed windings 84 and 85.

It will now be apparent that outward motion of winding 86 provides a better inductive coupling with winding 85 so that a greater signal will be induced in the latter winding than in winding 84 to provide an output signal of one direction while inward motion of winding 86 provides a better inductive coupling with winding 84 so that a greater signal will be induced in the latter winding than in winding 85 to provide an output or resultant signal of an opposite direction.

The interior of housing 70 communicates with the static pressure available in chamber 78 by way of a channel 97 formed in rear cover 71, a channel 98 formed in casing 70 and a channel 99 whose opening into the interior of the casing is provided with a conical valve seat member 100, better shown in Figure 4. Also suitably mounted within the casing is an electromagnet 101 comprising a core 102 having wound thereon a coil 103 which, when energized, deflects a clapper 104 outwardly about a pivot point 105 to engage valve 100 and thereby close the interior of the casing from static pressure. Coil 103 corresponds to coil 55 of Figure 1 and is adapted for connection to a battery 56 by way of switch 57. When the switch is opened to de-energize coil 103, a resilient member 106 secured to the electromagnet at one end by way of a bolt 107 and at its other end to the clapper, urges the latter outwardly away from valve seat 100 to open communication of the housing to the static pressure chamber.

In flight, the pilot brings the craft to the desired altitude with switch 57 opened and coil 103 de-energized so that equal pressures exist on both sides of the diaphragms or bellows 74 and winding 86 remains centered relative to fixed windings 84 and 85. To maintain the desired altitude, switch 57 is closed whereby communication between the interior of housing 70 is closed off from pressure chamber 78 and any pressure change thereafter due to changes from the prescribed altitude manifests itself in expansion or contraction of bellows 74 to linearly displace winding 86 relative to fixed windings 84 and 85 whereby a signal in the proper sense is developed in the latter for elevator control.

If the pilot, after maintaining a certain altitude of flight, desires to change craft flight to another altitude level he simply opens switch 57 to de-energize coil 103 of the electromagnet whereupon pressures on both sides of the diaphragm equalize and winding 86 is returned to its normally central or null position. Thereafter, the pilot trims his craft into a climb by operating or angularly displacing wound rotor 27 of the pitch repeater device. Once the craft attains the desired new altitude it is levelled off and switch 57 again closed whereby the altitude control unit hereof maintains the craft in the new altitude in the manner heretofore described.

Should, for some reason, the pilot change his craft elevation from one altitude to another and forget to open switch 57 and thus de-energize the altitude control unit, a novel safety feature is provided to prevent over expansion or contraction of the diaphragms. To this end, a by-pass channel 108 is provided communicating channel 98 with the interior of casing 70. The outer end of channel 108 is provided, as shown in Figure 2, with a valve seat 109 which is normally engaged by a valve member 110 carried by a resilient strip 111 so that, normally communication of the casing with the by-pass channel is closed. Strip 111 is fastened to the bottom of the casing by way of screws 112 and is provided with a central aperture 113.

A decreased extension of shaft 90 supporting the movable winding 86 thereon, passes through a bearing 114, formed in the casing, to extend through aperture 113 of strip 111. Two adjustment or limit nuts 115 and 116 are provided on shaft 90, the latter being threaded to this end, one of the nuts 116 being on one side of strip 111 and the other nut 115 being on the opposite side of the strip. Moreover, an adjustment bolt 117 received by a part of the casing is mounted for engagement with strip 111.

Thus, with the foregoing, and assuming coil 103 to be energized whereby the interior of the casing is completely shut off from pressure chamber 78, a predetermined expansion of the diaphragms as determined by the initial positioning of nut 115 will force nut 115 into engagement with strip 111 to urge valve 110 away from seat 109 and thus open the casing to static pressure whereby the pressures will equalize on the bellows to prevent over expansion thereof. Assuming the same conditions, i. e., casing 70 shut off from pressure chamber 78 and a rapidly dropping pressure, such as that occurring during a craft climb and communicated to the interior of the diaphragms the latter will be caused to contract until a predetermined contraction occurs as determined by the initial setting of nut 116 which will engage strip 111 and draw it inwardly so that the upper portion of the strip will abut and pivot against nut 117 to open valve 110 from seat 109 to equalize the pressure on both sides of the bellows to prevent over contraction thereof.

As will now be apparent to those skilled in the art, a novel, simple and accurate altitude control unit has been provided for use with an automatic steering system to supplement the normal pitch control thereof whereby a craft may be maintained not only in a desired level attitude but will be also automatically maintained at a desired altitude level. Moreover, the unit incorporates a safety feature so that any damage which might otherwise result from a change in elevation without disconnecting the unit from the system, is positively avoided.

Although only a single embodiment of the present invention has been illustrated and described in detail, it is to be expressly understood that the invention is not limited thereto. Various changes can be made in the design and arrangement of the parts without departing from the spirit and scope of the invention as will now be understood by those skilled in the art. For a definition of the limits of the invention, reference will be had primarily to the appended claims.

I claim:

1. An aircraft altitude control unit for operating craft elevator to maintain the craft at a predetermined flight altitude level comprising a movable normally centered yieldable wall normally open on both sides thereof to static pressure, means for closing one side of said wall from said static pressure when said craft has attained a predetermined altitude level whereby said wall will move in response to changes in static pressure due to departure by said craft from said predetermined altitude, and a linearly displaceable electrical device connected to said wall for developing a signal proportional to the amount of its displacement by said wall from a normally centered position for operating said elevator.

2. An aircraft altitude control unit for operating craft elevator to maintain the craft at a predetermined flight altitude level comprising a movable normally centered yieldable wall normally open on both sides thereof to static pressure, means for closing one side of said wall from said static pressure when the craft has attained a predetermined altitude level whereby the wall is moved in response to changes in static pressure due to departure by the craft from said predetermined altitude, a linearly displaceable electrical device connected to said wall for developing a signal proportional to the amount of its displacement by said wall from a normally centered position for operating said elevator, and means responsive to a predetermined movement of said wall for opening said one side thereof to static pressure.

3. An aircraft altitude control unit for operating craft elevator to maintain the craft at a predetermined flight altitude level comprising a movable normally centered yieldable wall normally open on both sides thereof to static pressure, means for closing one side of said wall from said static pressure when the craft has attained a predetermined altitude level whereby the wall is moved in response to changes in static pressure due to departure by the craft from said predetermined altitude, and an electrical device comprising a pair of series opposed stator windings and a movable winding inductively coupled therewith normally centered with respect to said stator windings whereby equal and opposite signals are induced in said stator windings and connected to said wall for displacement thereby relative to said stator windings whereby unequal signals are induced in said stator windings to provide a resultant signal operating said elevator.

4. In an automatic pilot for aircraft having an elevator surface thereon, an altitude control unit for operating said surface through said pilot comprising a movable normally centered yieldable wall normally open on both sides thereof to static pressure, means for closing one side of said wall from said static pressure when said craft has attained a predetermined altitude level whereby the latter will move in response to changes in static pressure due to departure by the craft from said predetermined altitude, and means comprising a normally balanced electrical device and a movable current conducting member connected to said wall for unbalancing said device.

5. An altitude control unit for an aircraft automatic pilot for controlling the flight altitude of the craft comprising a movable normally centered yieldable wall normally open on both sides thereof to static pressure, electrical means for closing one side of said wall from said static pressure when the craft has attained a predetermined altitude level whereby the wall is moved in response to changes in static pressure due to departure by the craft from said predetermined altitude, an electrical device comprising a pair of series opposed stator windings and a movable winding inductively coupled therewith normally centered with respect to said stator windings whereby equal and opposite signals are induced in said stator windings and connected to said wall for displacement thereby relative to said stator windings whereby unequal signals are induced in said stator windings to thereby provide a resultant signal for operating said pilot to return the craft to said pre-selected altitude, and means operated by a predetermined movement of said wall for opening said one side thereof to static pressure.

6. An automatic altitude control unit for an aircraft automatic pilot for controlling the flight altitude of the craft comprising a movable normally centered yieldable wall normally open on both sides thereof to varying static pressure, means for closing one side of said wall from said static pressure when the craft has attained a predetermined altitude level whereby the wall is moved in response to changes in static pressure resulting from departure by the craft from said predetermined altitude, signal means for operating said pilot to return the craft to said predetermined altitude comprising a hollow cylindrical member, a pair of series opposed windings on said member, and a linearly movable winding within said cylindrical member and inductively coupled with said windings and connected to said wall for displacement thereby relative to said pair of windings.

7. An automatic altitude control unit for an aircraft automatic pilot for controlling the flight altitude of the craft comprising a movable normally centered yieldable wall normally open on both sides thereof to varying static pressure, means for closing one side of said wall from said static pressure when the craft has attained a predetermined altitude level whereby the wall is moved in response to changes in static pressure resulting from a departure by the craft from said predetermined altitude, signal means for operating said pilot to return the craft to said predetermined altitude comprising a hollow cylindrical core, a pair of series opposed windings on said core, a linearly movable winding within said core and inductively coupled with said windings and connected to said wall for displacement thereby relative to said pair of windings, and yieldable means for maintaining said movable winding normally centered with respect to said pair of windings.

8. An altitude control unit for an aircraft automatic pilot for maintaining the flight level of the craft at a predetermined altitude comprising an expansible and contractable container having one side thereof in communication with static pressure, a casing for said container and having an opening for communicating static pressure to the other side of said container whereby the latter is normally centered, a linearly displaceable electrical device within said casing and connected to said container, means normally maintaining said device in a null position, and means for closing said opening when said craft has attained a predetermined altitude level whereby said container expands or contracts in response to changes in static pressure due to departure by the craft from said predetermined altitude for displacing said device from said null position.

9. An altitude control unit for an aircraft automatic pilot for maintaining the flight level of the craft at a predetermined altitude comprising an expansible and contractable container having one side thereof in communication with static pressure, a casing for said container and having an opening for communicating static pressure to the other side of said container whereby the latter is normally centered, a signal generating device within said casing and connected to said container, means normally maintaining said device in a non-signal generating condition, means for closing said opening when the craft has attained a predetermined altitude level whereby said container expands or contracts in response to changes in static pressure due to departure by the craft from said predetermined altitude for actuating said device, and a valve responsive to a predetermined expansion or contraction of said container for opening said other side of said container to static pressure.

10. An altitude control unit for controlling the elevator surface of an aircraft to maintain the craft at a predetermined altitude comprising an expansible and contractable container having one side thereof in communication with static pressure, a casing for said container and having a pair of openings for communicating static pressure to the other side of said container whereby the latter is normally centered, valve means normally closing one of said openings, a signal generating device within said casing and connected to said container, means normally maintaining said device in a non-signal generating condition, means for closing the other of said openings when the craft has attained a predetermined altitude level whereby said container expands or contracts in response to changes in static pressure due to departure by the craft from the predetermined altitude for actuating said device, and means connecting said valve means for actuation by said container in response to a predetermined expansion or contraction thereof.

11. An altitude control unit for controlling the elevator surface of an aircraft to maintain the craft at a predetermined altitude level comprising an expansible and contractable container having one side thereof in communication with static pressure, a casing for said container and having a pair of openings for communicating static pressure to the other side of said container whereby the latter is normally centered, signal means within said casing and comprising a hollow cylindrical core, a pair of series opposed windings on said core, a linearly movable winding within said core and inductively coupled with said windings and connected to said container for displacement thereby relative to said pair of windings, yieldable means for maintaining said movable winding normally centered with respect to said pair of windings, valve means normally closing one of said openings, means for closing the other of said openings when the craft has attained a predetermined altitude level whereby said container expands or contracts in response to changes in static pressure due to departure by the craft from the predetermined altitude for displacing said movable winding, and means connecting said valve means for actuation by said container in response to a predetermined expansion or contraction thereof.

12. A control unit for controlling the elevator surface of an aircraft to maintain the craft at a predetermined altitude level comprising an expansible and contractable container having one side thereof in communication with a changing pressure resulting from the craft changes of altitude, a casing for said container and having a pair of openings for communicating said pressure to the other side of said container whereby the latter is normally centered, valve means normally closing one of said openings, a signal generating device within said casing and connected to said container, means normally maintaining said device in a non-signal generating condition, means for closing the other of said openings when the craft has attained a predetermined altitude level whereby said container expands or contracts in response to changes in craft altitude from said predetermined altitude for actuating said device, and means connecting said valve means for actuation by said container in response to a predetermined expansion or contraction thereof.

13. In an automatic pilot for aircraft having a movable control surface and a servomotor for operating said surface, altitude responsive means for governing the operation of the motor to maintain craft flight at a predetermined altitude level comprising a normally centered bellows normally opened on both of its sides to static pressure, means for closing one side of said bellows from communication with said pressure when said craft has attained a predetermined altitude level whereby changes in said pressure due to departure by the craft from the predetermined altitude level are communicated to the other side of said bellows whereby the latter expands or contracts, and an electrical device comprising an elongated wound core member and a displaceable armature member connected for displacement by said bellows longitudinally of said core member for developing a signal proportional to the amount of its displacement from a null position for governing operation of said motor to deflect said surface to return the craft to said predetermined altitude level.

14. In an automatic pilot for aircraft having a movable control surface, altitude responsive means for governing the operation of the motor to maintain craft flight at a predetermined altitude level comprising a normally centered bellows normally opened on both of its sides to static pressure, means for closing one side of said bellows from communication with said pressure when said craft has attained a predetermined altitude level whereby changes in said pressure due to departure by the craft from the predetermined altitude level are communicated to the other side of said bellows whereby the latter expands or contracts, a displaceable electrical device adapted for operation by the expansion or contraction of said bellows for developing a signal proportional to the amount of its displacement from a null position for governing operation of said motor to deflect said surface to return the craft to said predetermined altitude, and means responsive to a predetermined expansion or contraction of said bellows for opening said one side thereof to static pressure.

15. In an automatic pilot for aircraft having a movable control surface and a servomotor for operating said surface, altitude responsive means for governing the operation of the motor to maintain craft flight at a predetermined altitude level comprising a normally centered bellows normally opened on both of its sides to static pressure, means for closing one side of said bellows from communication with said pressure when said craft has attained a predetermined altitude level whereby changes in said pressure due to departure by the craft from the predetermined altitude level are communicated to the other side of said bellows whereby the latter expands or contracts, and an electrical device comprising a pair of stationary series opposed windings and a normally centered movable winding inductively coupled therewith and connected for movement by said bellows longitudinally of said windings for developing a signal proportional to the amount of its displacement from a null position for governing operation of said motor to deflect said surface to return the craft to said predetermined altitude.

RICHARD L. DIVOLL.

REFERENCES CITED

The following references are of record in the file of this patent:

UNITED STATES PATENTS

| Number | Name | Date |
| --- | --- | --- |
| 1,922,194 | Brown et al. | Aug. 15, 1933 |
| 2,091,300 | Bassett | Aug. 31, 1937 |
| 2,358,803 | Hanson et al. | Sept. 26, 1944 |
| 2,415,429 | Kellogg | Feb. 11, 1947 |
| 2,415,430 | Frische | Feb. 11, 1947 |